(12) United States Patent
Webb et al.

(10) Patent No.: US 6,687,295 B1
(45) Date of Patent: Feb. 3, 2004

(54) METHOD AND APPARATUS FOR MOTION ESTIMATION FOR ENCODING SEQUENTIAL FRAMES

(75) Inventors: Richard W. Webb, Los Gatos, CA (US); Haitao Guo, San Jose, CA (US)

(73) Assignee: ATI International, Barbados (BB)

( * ) Notice: Subject to any disclaimer, the term of this patent is extended or adjusted under 35 U.S.C. 154(b) by 528 days.

(21) Appl. No.: 09/628,050

(22) Filed: Jul. 27, 2000

(51) Int. Cl.[7] ................................................. H04N 7/12
(52) U.S. Cl. ................................. 375/240.12; 348/700
(58) Field of Search ........................ 375/240.12, 240.16, 375/240.18; 348/699, 700, 414.1, 417.1, 416.1; H04N 7/12, 11/02, 11/04

(56) References Cited

U.S. PATENT DOCUMENTS

| | | | | |
|---|---|---|---|---|
| 6,049,362 A | * | 4/2000 | Butter et al. | 348/699 |
| 6,128,047 A | * | 10/2000 | Chang et al. | 348/699 |
| 6,285,711 B1 | * | 9/2001 | Ratakonda et al. | 375/240.16 |
| 6,339,616 B1 | * | 1/2002 | Kovalev | 375/240.16 |
| 6,424,679 B1 | * | 7/2002 | Dabak et al. | 375/240.16 |
| 6,430,223 B1 | * | 8/2002 | Lim | 375/240.16 |

* cited by examiner

*Primary Examiner*—Nhon Diep
(74) *Attorney, Agent, or Firm*—Vedder, Price, Kaufman & Kammholz, P.C.

(57) ABSTRACT

A method and apparatus for motion estimation for encoding sequential frames is described. One embodiment of the invention provides efficiency by checking only four points surrounding a given point. Scores may be calculated corresponding to a level of difference between the given point in a reference frame and the points in a candidate frame. The efficiency may be further enhanced by storing scores of previously examined points for later use. The scores may be stored in a table. The table may be initialized to have invalid scores or scores corresponding to a great difference along search window boundaries to prevent searching outside of the search window boundaries. One embodiment of the invention implements a sliding window technique for efficient computation.

44 Claims, 11 Drawing Sheets

$dc1 = dc0 + a8 - a0$

METHOD AND APPARATUS FOR MOTION ESTIMATION FOR ENCODING SEQUENTIAL FRAMES

TECHNICAL FIELD OF THE INVENTION

The invention relates generally to encoding image information and more specifically to motion estimation.

BACKGROUND OF THE INVENTION

Image information, for example, motion picture information, video information, animated graphics information, etc., often involves large amounts of data. Image information often includes data to represent coloring, shading, texturing, and transparency of every pixel in every frame of the image information. Each frame may include hundreds of thousands or even millions of pixels. The frames are often presented in rapid succession, for example, at a rate of 30 frames per second, to convey a sense of motion. Thus, without some form of data compression, such image information could easily involve hundreds of millions of bits per second.

To avoid the need to store and transmit such large amounts of data, data compression techniques have been developed. Some data compression techniques have been designed to compress image information. One example is the type of encoding specified by the Moving Picture Experts Group (MPEG). MPEG encoding produces a stream of different types of frames. These frames include intra frames and non-intra frames. The intra frames include sufficient information to reconstruct a frame of unencoded image information without the need to reference other frames of encoded data. The non-intra frames, however, provide information that refers to other information encoded in intra or other non-intra frames, which are called reference frames. Unencoded frames represented by the non-intra frames may be reconstructed by applying the information contained in the non-intra frames to the information contained in the intra or other non-intra frames to which the non-intra frames refer.

Since the amount of information stored in non-intra frames is much smaller than the amount of information in the unencoded frames that the non-intra frames represent, the use of non-intra frames can help greatly reduce the amount of image information that needs to be stored or transmitted. One aspect of the non-intra frames that allows them to contain less information than the unencoded frames they represent is that the non-intra frames essentially recycle image information found in the reference frames. For example, an unencoded frame represented by an intra frame may depict several objects. The objects may be located in several areas of the frame. Since the advantage of moving images, such as motion pictures, video, and animated graphics, over still images is the ability of the moving images to convey a sense of motion, the objects located in several areas of the frame often move to different areas when they appear in subsequent frames.

Since the image information needed to represent the appearance of the objects is present in the reference frames, that information may be recycled in non-intra frames. The non-intra frames contain the information needed to update the location of the objects without having to contain all of the information needed to express the appearance of the objects. Therefore, to encode non-intra frames, the change in the position of the objects represented in the non-intra frames must be determined relative to the position of the objects represented in the reference frames. This determination is referred to as motion estimation.

One technique that has been used for motion estimation involves dividing an image into image blocks (i.e., square blocks of pixels within the image). Then a determination is made as to where the block of pixels was located in the previous frame. This process is done by matching the pattern one block at a time.

In greater detail, the process includes several steps. First, the current (non-intra, or predicted) frame is divided into blocks. Then, for each block, a collection of potentially matching blocks is defined in the reference (intra or predicted) frame. Then, all of the pixel differences are added up using absolute differences to determine a score. The matching block that has the best score is then selected.

The process may be implemented as a hierarchical search. In a hierarchical search, once a matching block is selected, the process is repeated at a finer resolution until a matching block of the desired resolution is identified.

There are several drawbacks associated with such prior art techniques. For example, the step of defining a collection of potentially matching block in the reference frame often requires the examination of a very large number of potentially matching blocks. Also, the step of adding up the pixel differences to determine a score for each block requires a large number of operations. For example, for a 16×16 pixel block, 256 absolute differences had to be added. Since these operations must be repeated for each potentially matching block, the overall process is cumbersome and inefficient. Thus, an efficient technique is needed to provide motion estimation for encoding sequential frames.

DETAILED DESCRIPTION OF A PREFERRED EMBODIMENT

A method and apparatus for motion estimation for encoding sequential frames is described. One embodiment of the invention provides efficiency by checking only four points surrounding a given point. Scores may be calculated corresponding to a level of difference between the given point in a reference frame and the points in a candidate frame. The efficiency may be further enhanced by storing scores of previously examined points for later use. The scores may be stored in a table. The table may be initialized to have invalid scores or scores corresponding to a great difference along search window boundaries to prevent searching outside of the search window boundaries. One embodiment of the invention implements a sliding window technique for efficient computation.

Figure 1:
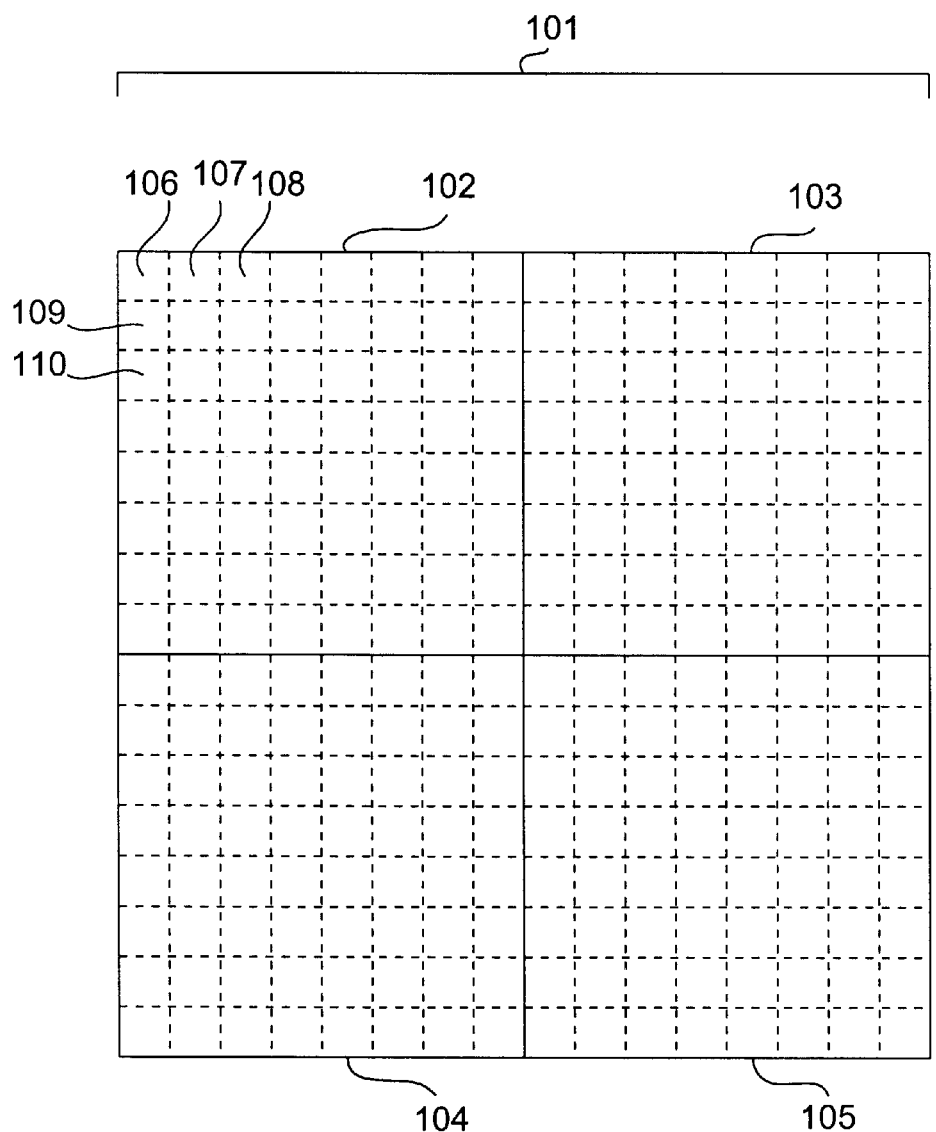
FIG. 1 is a diagram illustrating a block 101 divided into a plurality of block regions 102, 103, 104, and 105 in accordance with an embodiment of the invention.

FIG. 1 is a diagram illustrating a block 101 divided into a plurality of block regions 102, 103, 104, and 105 in accordance with an embodiment of the invention. Block 101 may be representative of a reference frame block when a candidate frame is divided into blocks. The reference frame may be any frame that serves as a basis for encoding a current frame. For example, the reference frame may be an intra frame or non-intra frame that has already been encoded.

To encode the current frame, a number of candidate blocks are analyzed to determine their similarity to a block of the reference frame. In the illustrated example, block 101 comprises a two-dimensional array of pixels including pixels 106, 107, 108, 109, and 110. The two-dimensional array is organized as rows and columns. For example, one row includes pixels 106, 107, and 108, while one column includes pixels 106, 109, and 110. Thus, the pixels forming the rows and columns need not be mutually exclusive. By dividing the block 101 into a plurality of block regions 102, 103, 104, and 105, the need to process the entire 256-pixel (16×16) block as a single unit is obviated.

One embodiment of the invention allows further gains in efficiency in the processing of a block to determine the similarity of a reference frame block to a candidate frame block. These efficiency gains are achieved by calculating averages for each block region and using the averages to compare the candidate frame blocks to the reference frame block rather than having to compare the blocks on a pixel-by-pixel basis.

Figure 2:
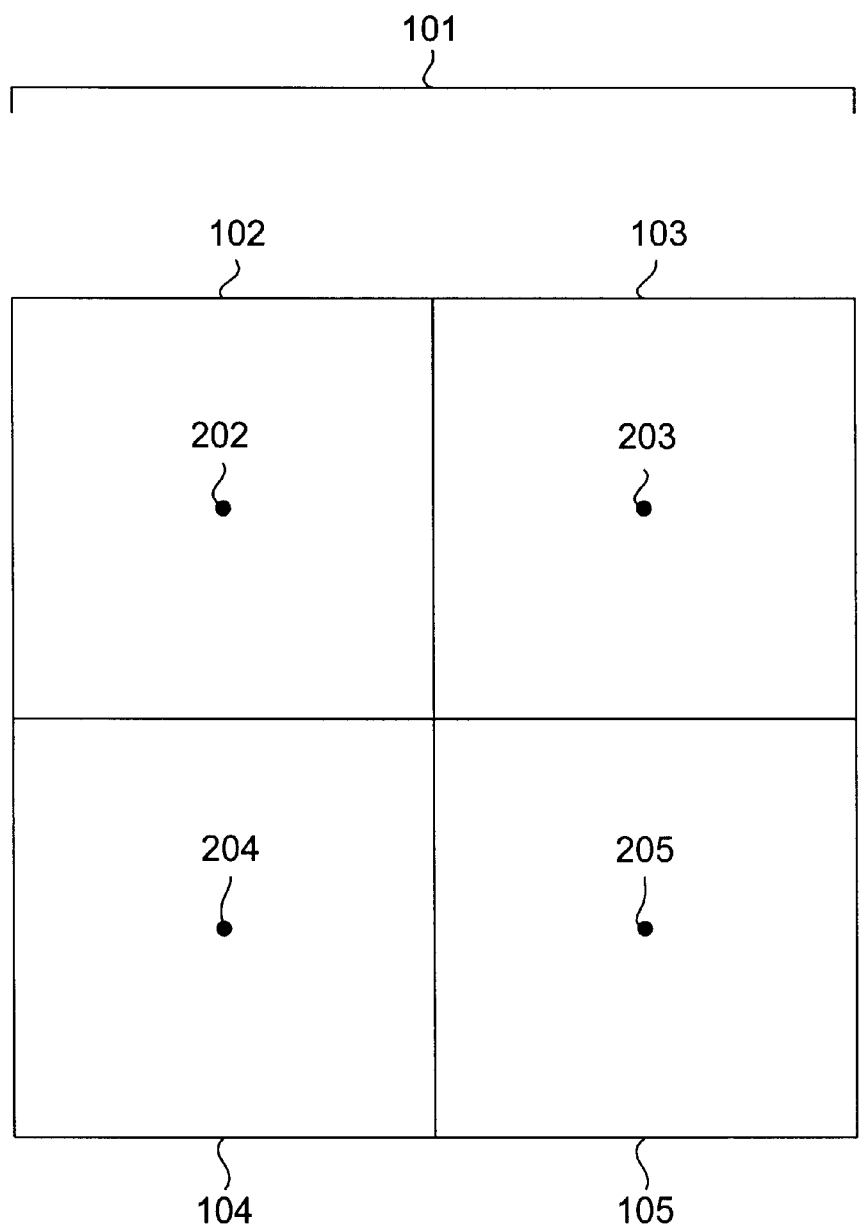
FIG. 2 is a diagram illustrating a plurality of block regions 102, 103, 104, and 105 of block 101 represented by respective averages 202, 203, 204, and 205 in accordance with an embodiment of the invention.

FIG. 2 is a diagram illustrating a plurality of block regions 102, 103, 104, and 105 of block 101 represented by respective averages 202, 203, 204, and 205 in accordance with an embodiment of the invention. While comparison of 256 pixels per block was previously required, one embodiment of the invention allows comparison of one average value per block region, resulting in comparison of four average values per block.

Figure 3:
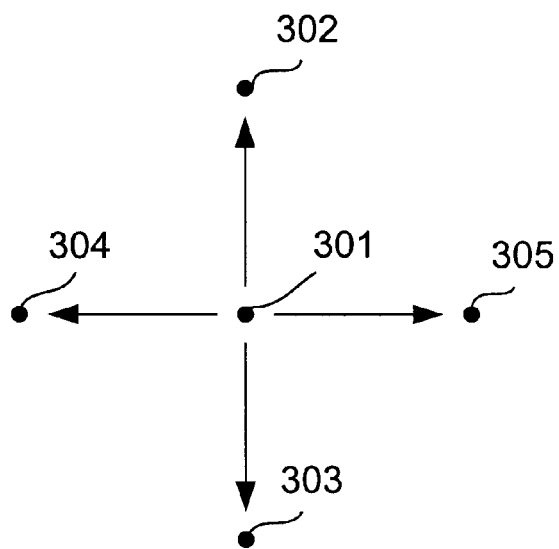
FIG. 3 is a diagram illustrating a point 301 and examples of four surrounding points 302, 303, 304, and 305 in accordance with an embodiment of the invention.

FIG. 3 is a diagram illustrating a point 301 and examples of four surrounding points 302, 303, 304, and 305 in accordance with an embodiment of the invention. By comparing a point 301 with a point 302 above point 301, a point 303 below point 301, a point 304 to the left of point 301, and a point 305 to the right of point 301, a direction of motion of an object in the selected block of the current frame relative to the corresponding block of the reference frame can be quickly identified. Point 301 can be considered to be the average of a reference frame block region, while the points 302, 303, 304, and 305 can be considered to be averages of candidate frame block regions offset upward, downward, leftward, and rightward, respectively, relative to the reference frame block region. The average of the candidate frame block region that is most similar to the reference frame block region may be selected and used to determine the direction of motion of an object represented in the block region.

Moreover, once the candidate frame block region having the most similarity is identified, the comparison may be repeated relative to that block region. Such repetition allows a most similar candidate frame block region to be iteratively determined. Thus, for example, if motion of an object has caused that object to be shifted two block regions to the left and one block region up, the first comparison might indicate that the candidate frame block region with the highest similarity is located to the left of the reference frame block region. The second comparison might indicate that the candidate frame block region with the highest similarity is located to the left of the previously indicated candidate frame block region. The third comparison might indicate that the candidate frame block region is located above the second previously indicated candidate frame block region. Thus, the most similar candidate frame block region can be easily identified. Depending on the circumstances, the particular iterative path toward the most similar candidate frame block region may vary, but the final result will most likely be the most similar candidate frame block region.

For example, to continue with the above example, the iterative steps may occur in the order left-left-up, left-up-left, or up-left-left, depending on the circumstances. However, the final block region identified will be that two to the left and one above the reference frame block region.

Figure 4:
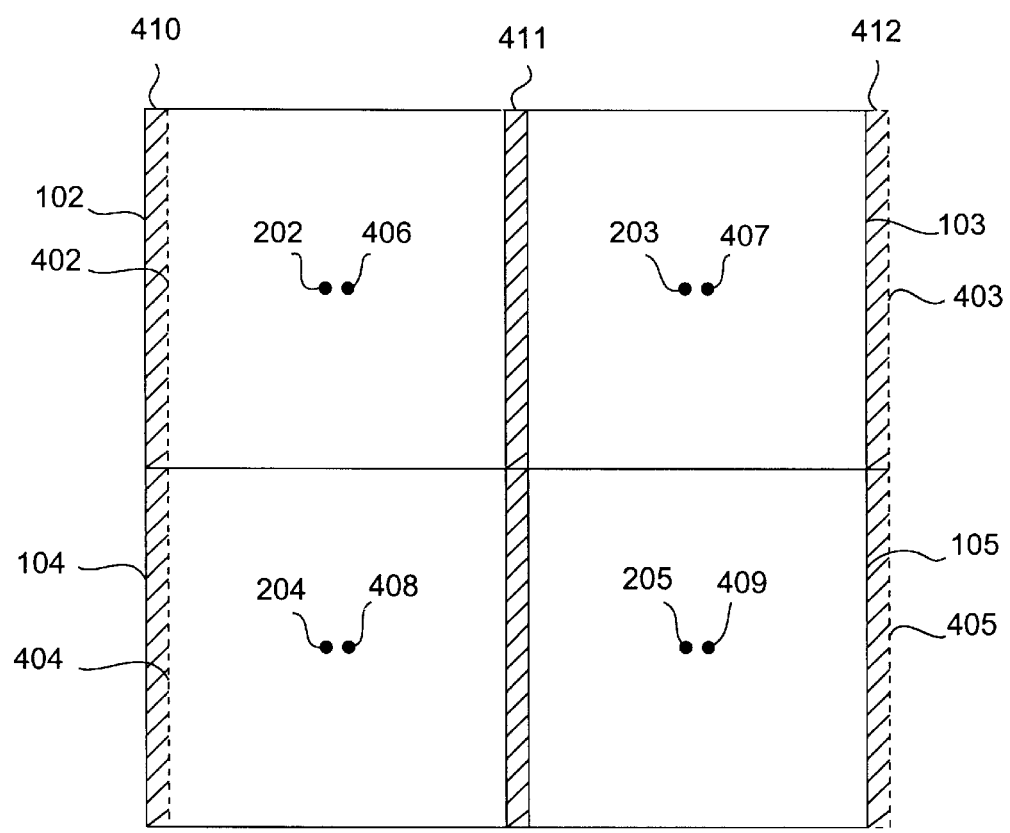
FIG. 4 is a diagram illustrating the plurality of block regions 102, 103, 104, and 105 and their respective averages 202, 203, 204, and 205 and a plurality of block regions 402, 403, 404, and 405 and their respective averages 406, 407, 408, and 409 shifted in position relative to the plurality of block regions 102, 103, 104, and 105 and their respective averages 202, 203, 204, and 205 in accordance with an embodiment of the invention.

FIG. 4 is a diagram illustrating the plurality of block regions 102, 103, 104, and 105 and their respective averages 202, 203, 204, and 205 and a plurality of block regions 402, 403, 404, and 405 and their respective averages 406, 407, 408, and 409 shifted in position relative to the plurality of block regions 102, 103, 104, and 105 and their respective averages 202, 203, 204, and 205 in accordance with an embodiment of the invention. To avoid the need to recalculate an average for a block region when the block region is shifted only slightly from a block region for which the average was previously calculated, another feature of the invention is utilized.

The feature used to avoid recalculation of averages for overlapping block regions is referred to as a sliding window technique. As can be seen from the example illustrated in FIG. 4, when block regions 102, 103, 104, and 105 are shifted slightly to the right, as illustrated by block regions 402, 403, 404, and 405, most of the area of the block regions remains the same. Only areas 410, 411, and 412 are different. Area 410 is not present in block regions 402 and 404, but is replaced by area 411. Area 411 is not present in block regions 403 and 405, but is replaced by area 412.

Thus, to calculate averages 406, 407, 408, and 409 based on averages 202, 203, 204, and 205, the sliding window technique subtracts the component of the average represented by the area that is no longer part of the block region and adds the component of the average represented by the area that is part of the block region but was not previously so. While the example of the sliding window technique illustrated in FIG. 4 occurs in a horizontal direction, the sliding window technique may also be implemented in a vertical direction.

Figure 5:
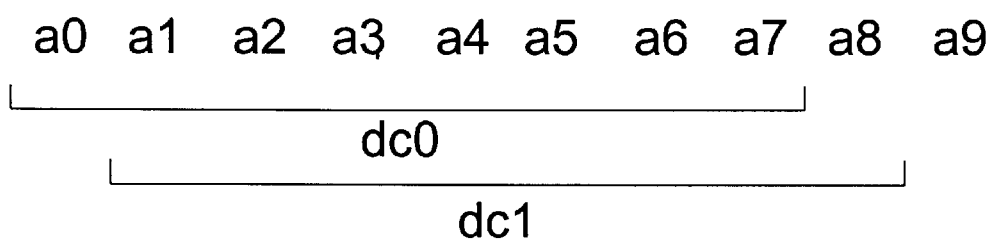
FIG. 5 is a diagram illustrating a sliding window technique in accordance with an embodiment of the invention.
Figure 6A:
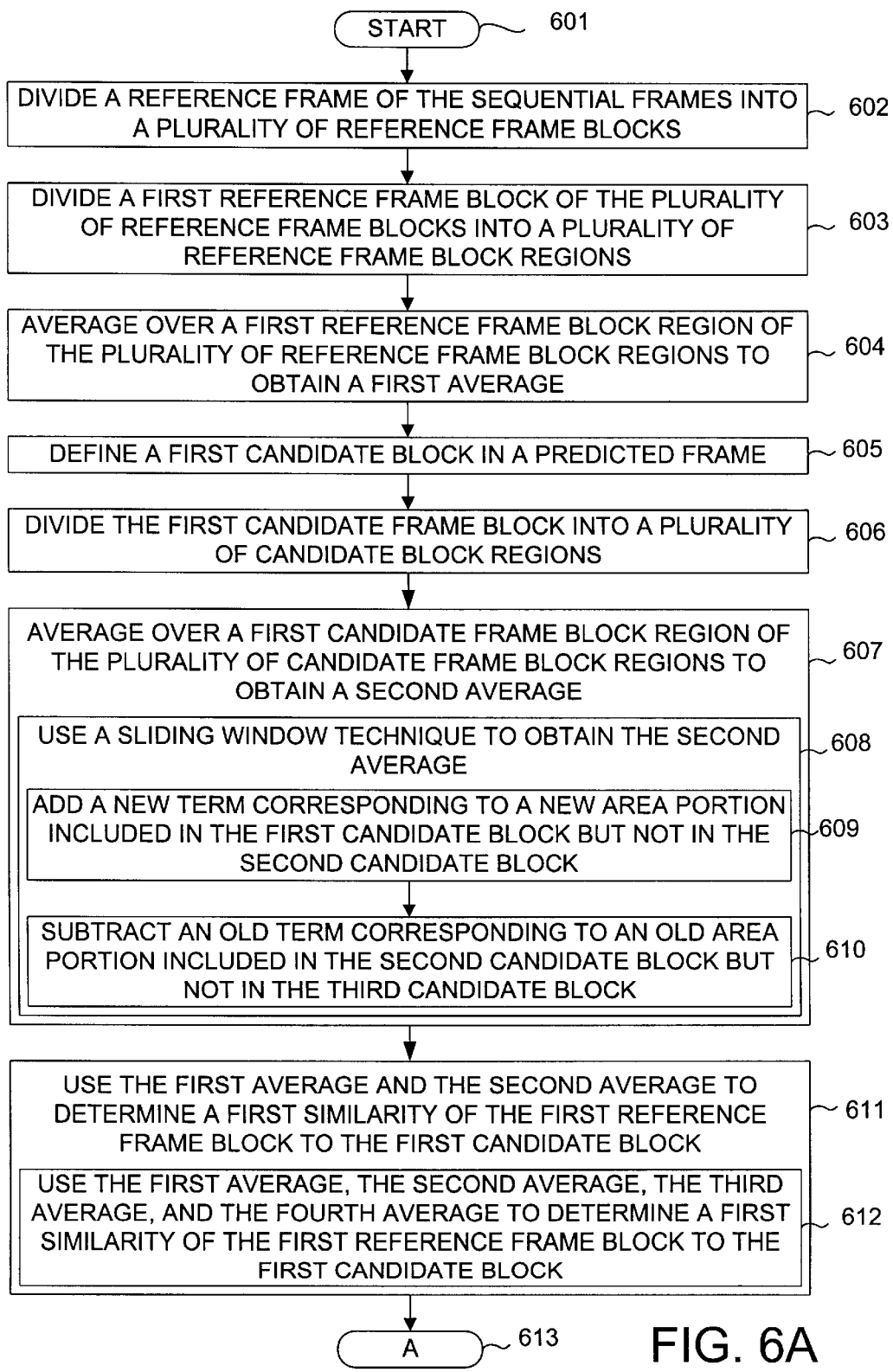
FIGS. 6A, 6B, 6C, 6D, and 6E are a flow diagram illustrating a process for motion estimation for encoding sequential frames in accordance with an embodiment of the invention.
Figure 6B:
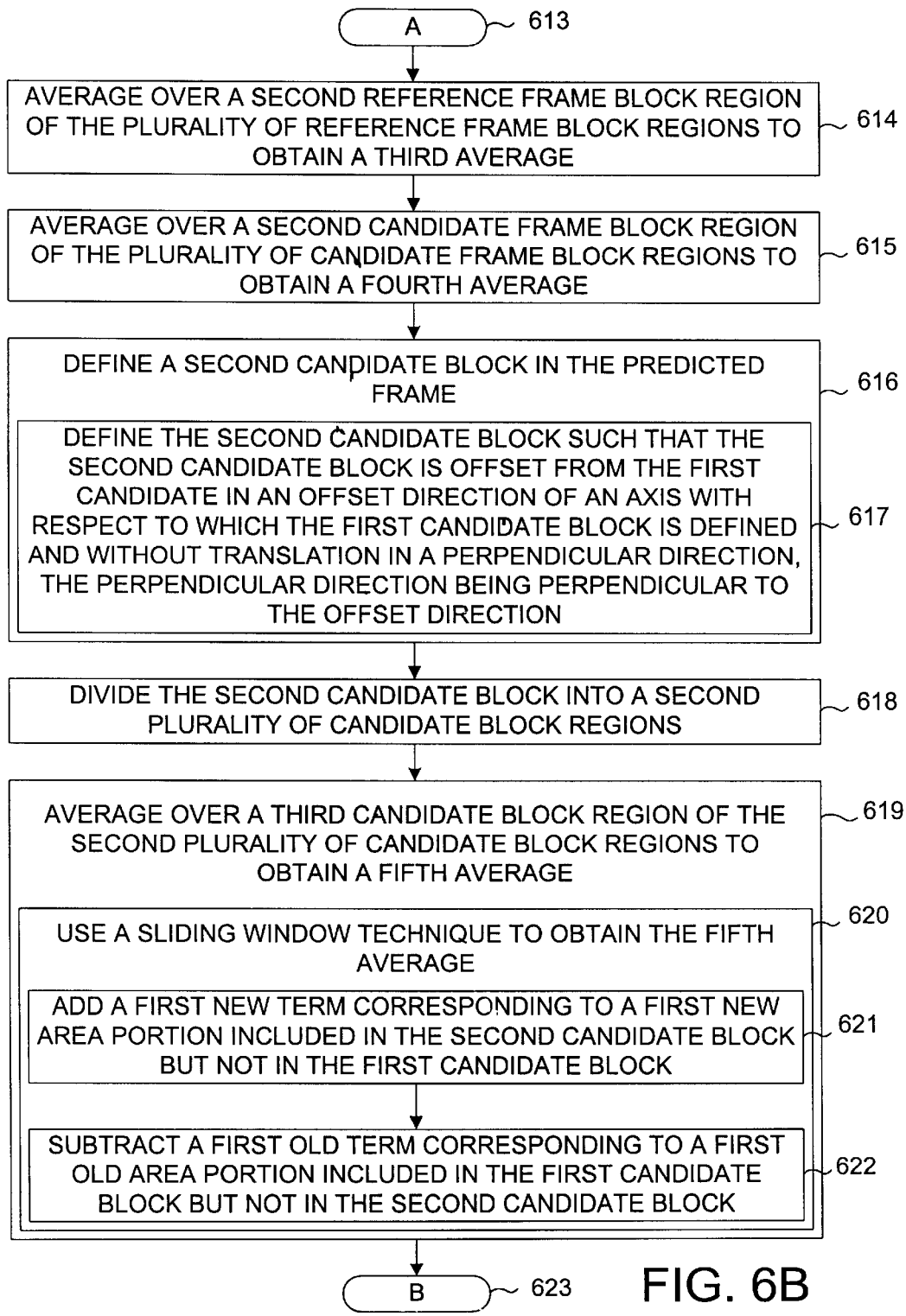
Figure 6C:
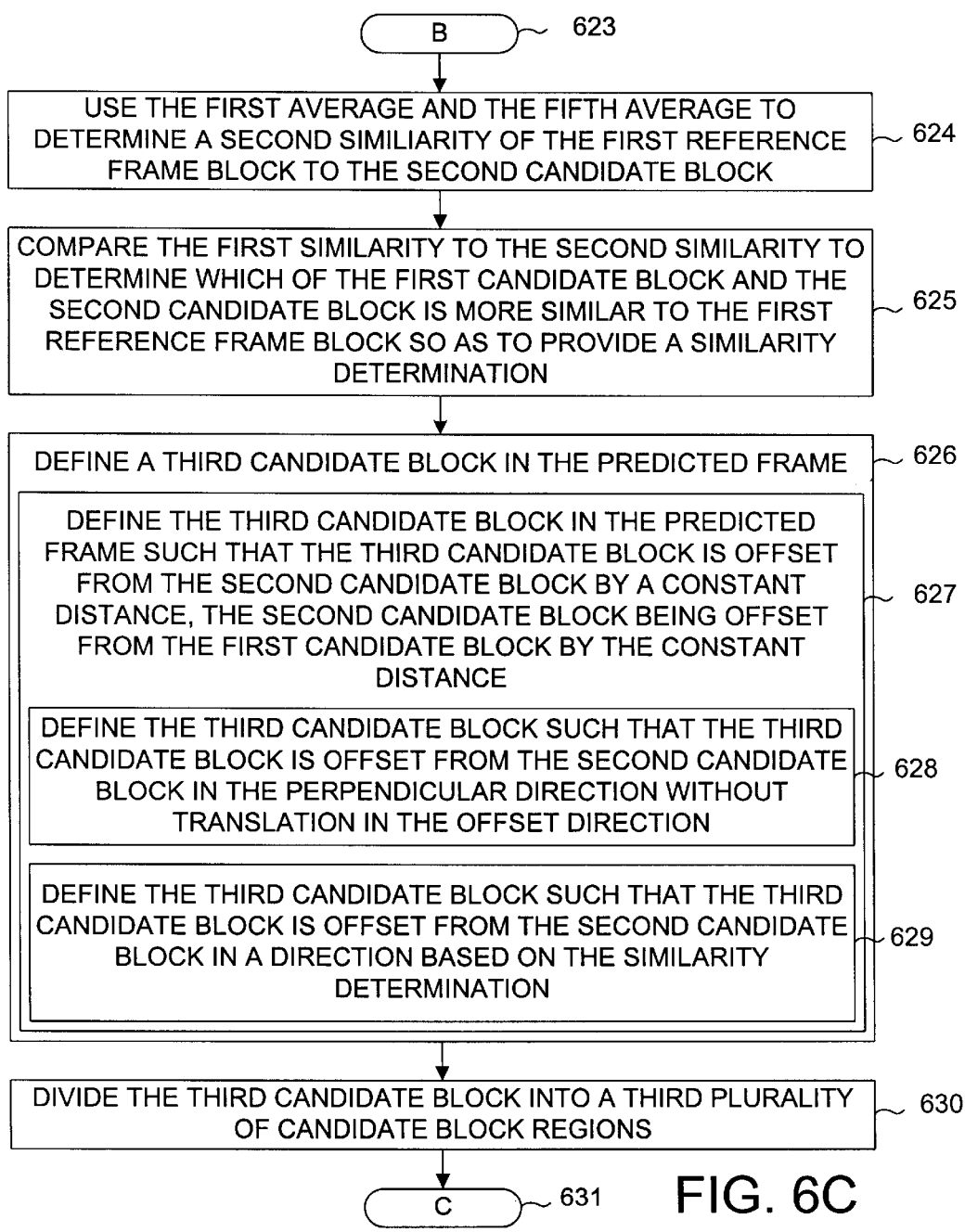
Figure 6D:
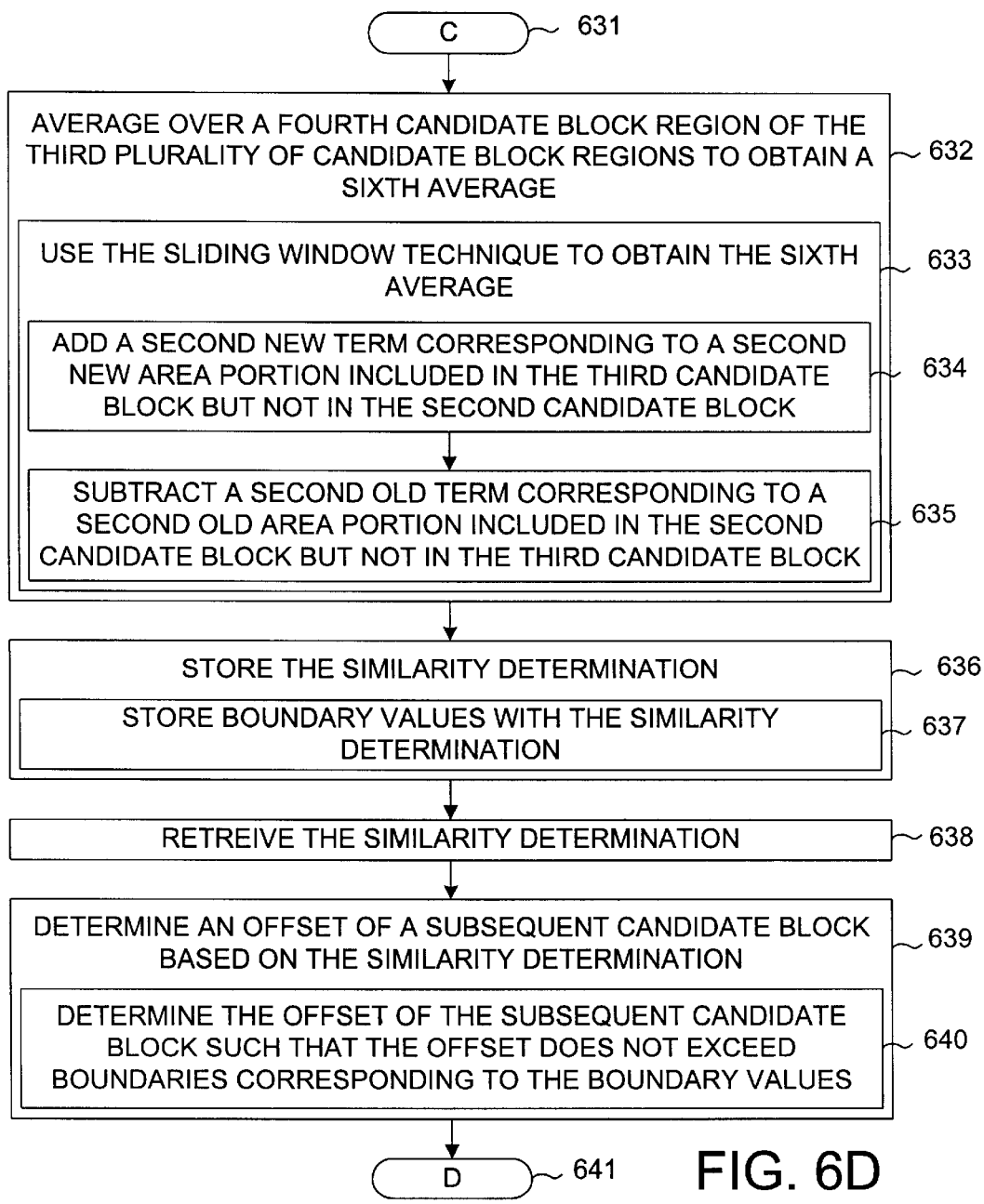
Figure 6E:
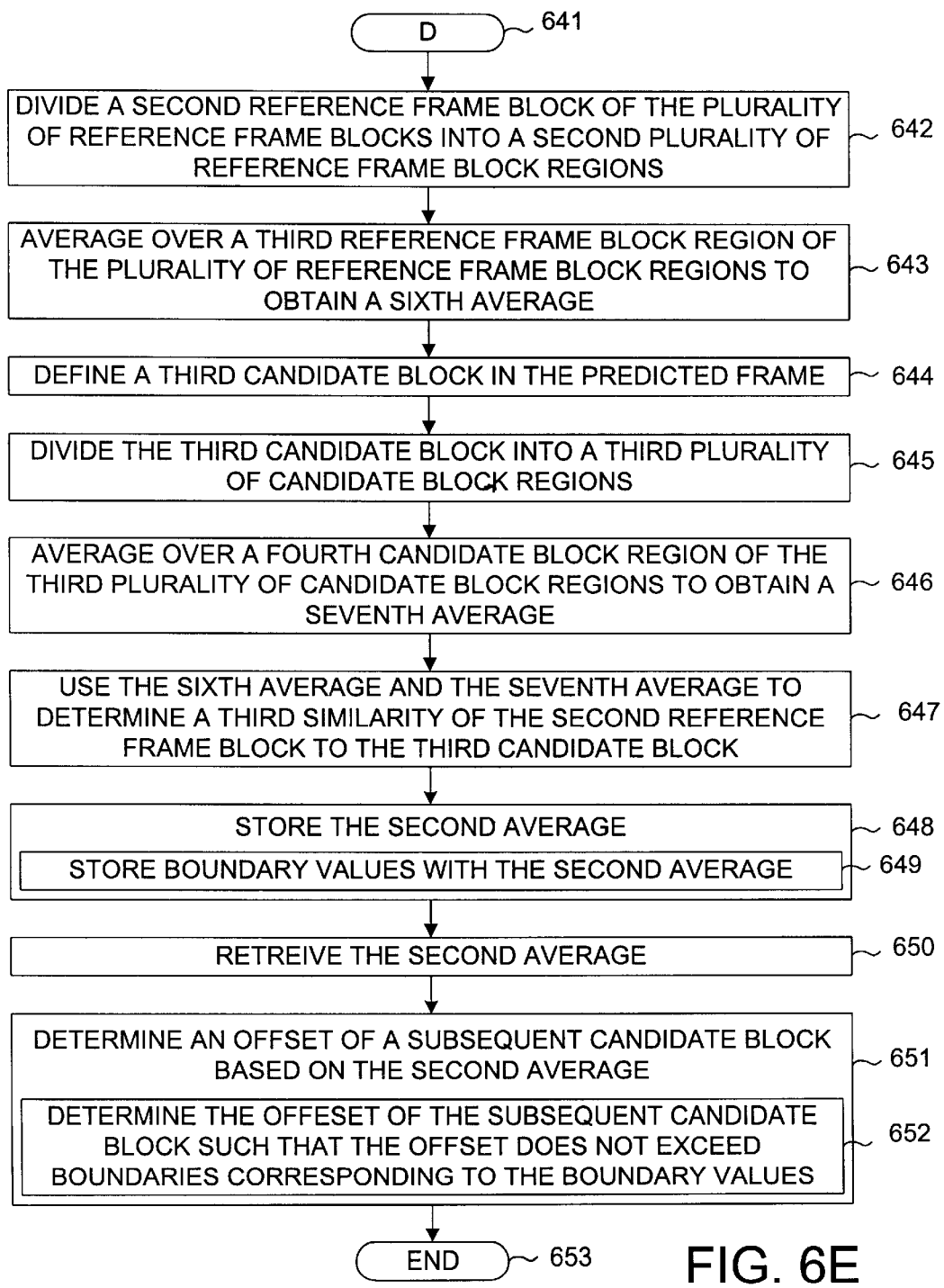

FIG. 5 is a diagram illustrating a sliding window technique in accordance with an embodiment of the invention. Adjacent points or pixels are represented as consecutively numbered elements a0, a1, a2, a3, a4, a5, a6, a7, a8, and a9. Those points or pixels contained within an initial block region are denoted by window dc0. When the initial block region is shifted to the right by one point or pixel, the points or pixels contained within the shifted block region are denoted by window dc1.

As can be seen, window dc1 differs from window dc0 only in that includes point or pixel a8 and omits point or pixel a0. Thus, the sum of the points or pixels contained within window dc1 can be calculated by taking the sum of the points or pixels contained within window dc0, adding point or pixel a8, and subtracting point or pixel a0. This relationship is denoted by the equation dc1=dc0+a8−a0.

This sliding window technique may be applied in either or both the horizontal and vertical directions. For example, referring back to FIG. 4, points or pixels in area 410 may be subtracted from the sum of block region 102 and points or pixels in area 411 may be added to the sum of block region 102 to obtain the sum of block region 402. The points or pixels in area 410 may be summed together first, then subtracted from the sum of block region 102. Alternatively, each point or pixel of area 410 that is to be subtracted from the sum of block region 102 may be subtracted from the sum of the row of block region 102 in which it is located. Then, after the points or pixels in area 411 are added in a row-by-row manner, the rows may be added to yield the sum of block region 402. A similar approach may be applied to the other block regions.

FIGS. 6A, 6B, 6C, 6D, and 6E are a flow diagram illustrating a process for motion estimation for encoding sequential frames in accordance with an embodiment of the invention. The process begins in step 601. In step 602, a reference frame of the sequential frames is divided into a plurality of reference frame blocks. In step 603, a first reference frame block of the plurality of reference frame blocks is divided into a plurality of reference frame block regions. In step 604, a first reference frame block region of the plurality of reference frame block regions is averaged to obtain a first average. In step 605, a first candidate block is defined in a predicted frame. In step 606, the first candidate block is divided into a plurality of candidate block regions.

In step 607, a first candidate frame block region of the plurality of candidate frame block regions is averaged to obtain a second average. Step 607 may include step 608. In step 608, a sliding window technique is used to obtain the second average. Step 608 may include steps 609 and 610. In step 609, a new term corresponding to a new area portion included in the first candidate block but not in the second candidate block is added. In step 610, an old term corresponding to an old area portion included in the second candidate block but not in the third candidate block is subtracted. From step 607, the process continues to step 611.

In step 611, the first average and the second average are used to determine a similarity of the first reference frame block to the first candidate block. Step 611 may include step 612. In step 612, the first average, the second average, the third average, and the fourth average are used to determine a similarity of the first reference frame block to the first candidate block. From step 611, the process continues to step 614 via reference A 613.

In step 614, a second reference frame block region of the plurality of reference frame block regions are averaged to obtain a third average. In step 615, a second candidate frame block region of the plurality of candidate frame block regions are averaged to obtain a fourth average.

In step 616, a second candidate block is defined in the predicted frame. Step 616 may include step 617. In step 617, the second candidate block is defined such that the second candidate block is offset from the first candidate block in an offset direction of an axis with respect to which the first candidate block is defined and without translation in a perpendicular direction, the perpendicular direction being perpendicular to the offset direction. From step 616, the process continues to step 618.

In step 618, the second candidate block is divided into a second plurality of candidate block regions. From step 618, the process continues in step 619. In step 619, a third candidate block region of the second plurality of candidate block regions is averaged to obtain a fifth average. Step 619 may include step 620. In step 620, a sliding window technique is used to obtain the fifth average. Step 620 may include step 621 and step 622. In step 621, a first new term corresponding to a first new area portion included in the second candidate block but not in the first candidate block is added. In step 622, a first old term corresponding to a first old area portion included in the first candidate block but not in the second candidate block is subtracted. From step 619, the process continues in step 624 via reference B 623.

In step 624, the first average and the fifth average are used to determine a second similarity of the first reference frame block to the second candidate block. From step 624, the process continues in step 625. In step 625, the first similarity and the second similarity are compared to determine which of the first candidate block and the second candidate block is more similar to the first reference frame block so as to provide a similarity determination. From step 625, the process continues to step 626.

In step 626, a third candidate block is defined in the predicted frame. Step 626 may include step 627. In step 627, the third candidate block is defined in the predicted frame such that the third candidate block is offset from the second candidate block by a constant distance, the second candidate block being offset from the first candidate block by the constant distance. Step 627 may include step 628 and step 629. In step 628, the third candidate block is defined such that the third candidate block is offset from the second candidate block in the perpendicular direction without translation in the offset direction. In step 629, the third candidate block is defined such that the third candidate block is offset from the second candidate block in a direction based on the similarity determination. From step 626, the process continues in step 630.

In step 630, the third candidate block is divided into a third plurality of candidate block regions. From step 630, the process continues in step 632 via reference C 631. In step 632, a fourth candidate block region of the third plurality of candidate block regions is averaged to obtain a sixth average. Step 632 may include step 633. In step 633, the sliding window technique is used to obtain the sixth average. Step 633 may include step 634 and step 635. In step 634, a second new term corresponding to a second new area portion included in the third candidate block but not in the second candidate block is added. In step 635, a second old term corresponding to a second old area portion included in the second candidate block but not in the third candidate block is subtracted. From step 632, the process continues to step 636.

In step 636, the similarity determination is stored. Step 636 may include step 637. In step 637, boundary values are stored with the similarity determination. From step 636, the process continues in step 638. In step 638, the similarity determination is retrieved. From step 638, the process continues to step 639. In step 639, an offset of a subsequent candidate block is determined based on the similarity determination. Step 639 may include step 640. In step 640, the offset of the subsequent candidate block is determined such that the offset does not exceed boundaries corresponding to the boundary values. From step 639, the process continues to step 642 via reference D 641.

The storage of similarity determinations can greatly increase the efficiency of a motion estimation process. When a similarity determination is stored, for example, in a look-up table, that similarity determination need not be recomputed for subsequent use. Rather, the similarity determination may be readily retrieved and used. Thus, unnecessary recomputation is avoided, thereby providing increased efficiency in the motion estimation process.

By providing for the storage of similarity determinations, a convenient technique for denoting boundaries is also provided. By storing values that correspond to dissimilarity in locations, for example, locations in a look-up table, where similarity determinations would otherwise be stored, retrieval of the values that correspond to dissimilarity tends to inhibit searching for candidate blocks in the direction of the values that correspond to dissimilarity. Thus, the values that correspond to dissimilarity tend to create an effective boundary for the comparison of candidate blocks. Since other more elaborate mechanisms for defining boundaries are obviated, this aspect of the invention further increases efficiency.

Moreover, while similarity determinations may be stored, retrieved, and used, with the similarity determinations representing similarities of reference frame blocks to candidate blocks, the similarity determinations also encompass the possibility of being expressed as differences between the reference frame blocks and the candidate blocks. Thus, the invention may be practiced using either expressions of similarity or of difference.

In step 642, a second reference frame block of the plurality of reference frame blocks is divided into a second plurality of reference frame block regions. From step 642, the process continues to step 643. In step 643, a third reference frame block region of the plurality of reference frame block regions is averaged to obtain a sixth average. From step 643, the process continues to step 644. In step 644, a third candidate block is defined in the predicted frame. From step 644, the process continues in step 645. In step 645, the third candidate block is divided into a third plurality of candidate block regions. From step 645, the process continues in step 646. In step 646, a fourth candidate block region of the third plurality of candidate block regions is averaged to obtain a seventh average. From step 646, the process continues in step 647. In step 647, the sixth average and the seventh average are used to determine a third similarity of the second reference frame block to the third candidate block. From step 647, the process continues in step 648.

In step 648, the second average is stored. Step 648 may include step 649. In step 649, the boundary values are stored with the second average. From step 648, the process continues to step 650. In step 650, the second average is retrieved. From step 650, the process continues to step 651. In step 651, an offset of a subsequent candidate block is determined based on the second average. Step 651 may include step 652. In step 652, the offset of the subsequent candidate block is determined such that the offset does not exceed boundaries corresponding to the boundary values. Following step 651, the process ends in step 653.

Figure 7:
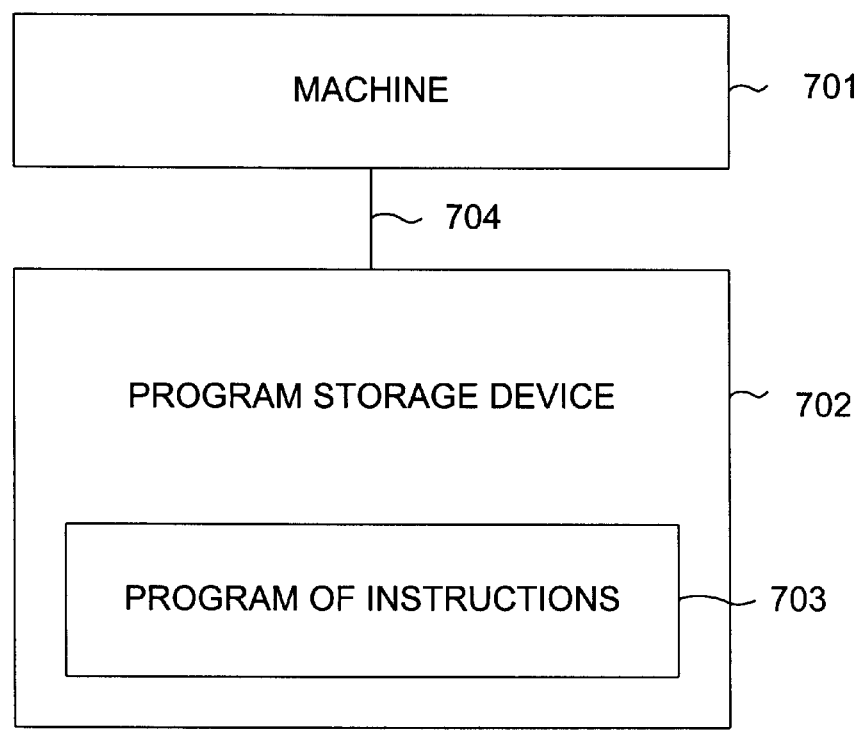
FIG. 7 is a block diagram illustrating a program storage device and a machine in accordance with an embodiment of the invention.

FIG. 7 is a block diagram illustrating a program storage device and a machine in accordance with an embodiment of the invention. Machine 701 is coupled to program storage device 702 via coupling 704. Program storage device 702 includes a program of instructions 703. The program storage device 702 is readable by the machine 701. The program storage device 702 tangibly embodies the program of instructions 703 executable by the machine 701 to perform a method of motion estimation for encoding sequential frames. The method may includes the steps recited with reference to FIG. 6. The machine 701 may be a general purpose computer system or a component thereof. Alternatively, the machine 701 may be specifically dedicated to performing the method steps described above.

Accordingly, a method and apparatus for motion estimation for encoding sequential frames has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method of motion estimation for encoding sequential frames comprising the steps of:

dividing a reference frame of the sequential frames into a plurality of reference frame blocks;

dividing a first reference frame block of the plurality of reference frame blocks into a plurality of reference frame block regions;

averaging over a first reference frame block region of the plurality of reference frame block regions to obtain a first average;

defining a first candidate block in a current frame;

dividing the first candidate block into a plurality of candidate block regions;

averaging over a plurality of first candidate frame block regions of the plurality of candidate frame block regions to obtain a plurality of averages;

using the first average and the plurality of averages to determine a similarity of the first reference frame block to a plurality of regions of the first candidate block.

2. The method of claim 1 further comprising the steps of:

averaging over a second reference frame block region of the plurality of reference frame block regions to obtain a second average;

averaging over a second candidate frame block region of the plurality of candidate frame block regions to obtain a third average.

3. The method of claim 2 wherein the step of using the first average and the second average to determine the first similarity of the first reference frame block to the first candidate block further comprises the step of:

using the first average, plurality of averages, the second average, and the third average to determine the first similarity of the first reference frame block to the first candidate block.

4. The method of claim 3 further comprising the steps of:

defining a second candidate block in the current frame;

dividing the second candidate block into a second plurality of candidate block regions;

averaging over a third candidate block region of the second plurality of candidate block regions to obtain a fourth average;

using the first average and the fourth average to determine a second similarity of the first reference frame block to the second candidate block; and comparing the first similarity to the second similarity to determine which of the first candidate block and the second candidate block is more similar to the first reference frame block so as to provide a similarity determination.

5. The method of claim 4 comprising the steps of:
defining a third candidate block in the current frame;
dividing the third candidate block into a third plurality of candidate block regions;
averaging over a fourth candidate block region of the third plurality of candidate block regions to obtain a fifth average.

6. The method of claim 5 wherein the step of defining the third candidate block in the current frame further comprises the step of:
defining the third candidate block in the current frame such that the third candidate block is offset from the second candidate block by a constant distance, the second candidate block being offset from the first candidate block by the constant distance.

7. The method of claim 6 wherein the step of defining the second candidate block in the current frame further comprises the step of:
defining the second candidate block such that the second candidate block is offset from the first candidate block in an offset direction of an axis with respect to which the first candidate block is defined and without translation in a perpendicular direction, the perpendicular direction being perpendicular to the offset direction.

8. The method of claim 7 wherein the set of defining the third candidate block in the current frame such that the third candidate block is offset from the second candidate block by the constant distance further comprises the step of:
defining the third candidate block such that the third candidate block is offset from the second candidate block in the perpendicular direction without translation in the offset direction.

9. The method of claim 6 wherein the step of defining the third candidate block in the current frame such that the third candidate block is offset from the second candidate block by the constant distance further comprises the step of:
defining the third candidate block such that the third candidate block is offset from the second candidate block in a direction based on the similarity determination.

10. The method of claim 9 further comprising the step of:
storing the similarity determination.

11. The method of claim 10 further comprising the steps of:
retrieving the similarity determination;
determining an offset of a subsequent candidate block based on the similarity determination.

12. The method of claim 11 further comprising the step of:
storing boundary values with the similarity determination.

13. The method of claim 12 wherein the step of determining the offset of the subsequent candidate block further comprises the step of:
determining the offset of the subsequent candidate block such that the offset does not exceed boundaries corresponding to the boundary values.

14. The method of claim 6 wherein the step of averaging over the second candidate block region of the second plurality of candidate block regions to obtain the fourth average further comprises the step of:
using a sliding window technique to obtain the fourth average.

15. The method of claim 14 wherein the step of using the sliding window technique to obtain the fourth average further comprises the step of:
adding a first new term corresponding to a first new area portion included in the second candidate block but not in the first candidate block;
subtracting a first old term corresponding to a first old area portion included in the first candidate block but not in the second candidate block.

16. The method of claim 15 wherein the step of averaging over the fourth candidate block region of the third plurality of candidate block regions to obtain the fifth average further comprises the step of:
using the sliding window technique to obtain the fifth average.

17. The method of claim 16 wherein the step of using the sliding window technique to obtain the fifth average further comprises the steps of:
adding a second new term corresponding to a second new area portion included in the third candidate block but not in the second candidate block;
subtracting a second old term corresponding to a second old area portion included in the second candidate block but not in the third candidate block.

18. The method of claim 4 further comprising the steps of:
dividing a second reference frame block of the plurality of reference frame blocks into a second plurality of reference frame block regions;
averaging over a third reference frame block region of the plurality of reference frame block regions to obtain a fifth average;
defining a third candidate block in the current frame;
dividing the third candidate block into a third plurality of candidate block regions;
averaging over a fourth candidate block region of the third plurality of candidate block regions to obtain a sixth average;
using the fifth average and the sixth average to determine a third similarity of the second reference frame block to the third candidate block.

19. The method of claim 4 wherein the step of averaging over the first candidate frame block region of the plurality of candidate frame block regions to obtain the second average further comprises the step of:
using a sliding window technique to obtain the second average.

20. The method of claim 19 wherein the step of using the sliding window technique to obtain the second average further comprises the step of:
adding a new term corresponding to a new area portion included in the first candidate block but not in the second candidate block;
subtracting an old term corresponding to an old area portion included in the second candidate block but not in the third candidate block.

21. A program storage device readable by a machine, tangibly embodying a program of instructions executable by the machine to perform a method of motion estimation for encoding sequential frames, the method comprising the steps of:
dividing a reference frame of the sequential frames into a plurality of reference frame blocks;
dividing a first reference frame block of the plurality of reference frame blocks into a plurality of reference frame block regions;
averaging over a first reference frame block region of the plurality of reference frame block regions to obtain a first average;

defining a first candidate block in a current frame;

dividing the first candidate block into a plurality of candidate block regions;

averaging over a plurality of first candidate frame block regions of the plurality of candidate frame block regions to obtain a plurality of averages;

using the first average and the plurality of averages to determine a similarity of the first reference frame block to a plurality of regions of the first candidate block.

22. The program storage device of claim 21 wherein the method further comprises the steps of:

averaging over a second reference frame block region of the plurality of reference frame block regions to obtain a second average;

averaging over a second candidate frame block region of the plurality of candidate frame block regions to obtain a third average.

23. The program storage device of claim 22 wherein the step of using the first average and the second average to determine the first similarity of the first reference frame block to the first candidate block further comprises the step of:

using the first average, plurality of averages, the second average, and the third average, to determine the first similarity of the first reference frame block to the first candidate block.

24. The program storage device of claim 23 wherein the method further comprises the steps of:

defining a second candidate block in the current frame;

dividing the second candidate block into a second plurality of candidate block regions;

averaging over a third candidate block region of the second plurality of candidate block regions to obtain a fourth average;

using the first average and the fourth average to determine a second similarity of the first reference frame block to the second candidate block; and comparing the first similarity to the second similarity to determine which of the first candidate block and the second candidate block is more similar to the first reference frame block so as to provide a similarity determination.

25. The program storage device of claim 24 wherein the method further comprises the steps of:

defining a third candidate block in the current frame;

dividing the third candidate block into a third plurality of candidate block regions;

averaging over a fourth candidate block region of the third plurality of candidate block regions to obtain a fifth average.

26. The program storage device of claim 25 wherein the step of defining the third candidate block in the current frame further comprises the step of:

defining the third candidate block in the current frame such that the third candidate block is offset from the second candidate block by a constant distance, the second candidate block being offset from the first candidate block by the constant distance.

27. The program storage device of claim 26 wherein the step of defining the second candidate block in the current frame further comprises the step of:

defining the second candidate block such that the second candidate block is offset from the first candidate block in an offset direction of an axis with respect to which the first candidate block is defined and without translation, in a perpendicular direction, the perpendicular direction being perpendicular to the offset direction.

28. The program storage device of claim 27 wherein the step of defining the third candidate block in the current frame such that the third candidate block is offset from the second candidate block by the constant distance further comprises the step of:

defining the third candidate block such that the third candidate block is offset from the second candidate block in the perpendicular direction without translation in the offset direction.

29. The program storage device of claim 26 wherein the step of defining the third candidate block in the current frame such that the third candidate block is offset from the second candidate block by the constant distance further comprises the step of:

defining the third candidate block such that the third candidate block is offset from the second candidate block in a direction based on the similarity determination.

30. The program storage device of claim 29 wherein the method further comprises the step of:

storing the similarity determination.

31. The program storage device of claim 30 wherein the method further comprises the steps of:

retrieving the similarity determination;

determining an offset of a subsequent candidate block based on the similarity determination.

32. The program storage device of claim 31 wherein the method further comprises the step of:

storing boundary values with the similarity determination.

33. The program storage device of claim 32 wherein the step of determining the offset of the subsequent candidate block further comprises the step of:

determining the offset of the subsequent candidate block such that the offset does not exceed boundaries corresponding to the boundary values.

34. The program storage device of claim 26 wherein the step of averaging over the third candidate block region of the second plurality of candidate block regions to obtain the fifth average further comprises the step of:

using a sliding window technique to obtain the fourth average.

35. The program storage device of claim 34 wherein the step of using the sliding window technique to obtain the fourth average further comprises the step of:

adding a first new term corresponding to a first new area portion included in the second candidate block but not in the first candidate block;

subtracting a first old term corresponding to a first old area portion included in the first candidate block but not in the second candidate block.

36. The program storage device of claim 35 wherein the step of averaging over the fourth candidate block region of the third plurality of candidate block regions to obtain the fifth average further comprises the step of:

using the sliding window technique to obtain the fifth average.

37. The program storage device of claim 36 wherein the step of using the sliding window technique to obtain the fifth average further comprises the steps of:

adding a second new term corresponding to a second new area portion included in the third candidate block but not in the second candidate block;

subtracting a second old term corresponding to a second old area portion included in the second candidate block but not in the third candidate block.

38. The program storage device of claim 24 wherein the method further comprises the steps of:

dividing a second reference frame block of the plurality of reference frame blocks into a second plurality of reference frame block regions;

averaging over a third reference frame block region of the plurality of reference frame block regions to obtain a fifth average;

defining a third candidate block in the current frame;

dividing the third candidate block into a third plurality of candidate block regions;

averaging over a fourth candidate block region of the third plurality of candidate block regions to obtain a sixth average;

using the fifth average and the sixth average to determine a third similarity of the second reference frame block to the third candidate block.

39. The program storage device of claim 24 wherein the step of averaging over the first candidate frame block region of the plurality of candidate frame block regions to obtain the second average further comprises the step of:

using a sliding window technique to obtain the second average.

40. The program storage device of claim 39 wherein the step of using the sliding window technique to obtain the second average further comprises the step of:

adding a new term corresponding to a new area portion included in the first candidate block but not in the second candidate block;

subtracting an old term corresponding to an old area portion included in the second candidate block but not in the third candidate block.

41. A method of motion estimation for encoding sequential frames comprising the steps of:

dividing a reference frame of the sequential frames into a plurality of reference frame blocks;

dividing a first reference frame block of the plurality of reference frame blocks into a plurality of reference frame block regions;

averaging over a first reference frame block region of the plurality of reference frame block regions to obtain a first average;

defining a first candidate block in a current frame;

dividing the first candidate block into a plurality of candidate block regions;

averaging over a first candidate frame block region of the plurality of candidate frame block regions to obtain a second average;

using the first average and the second average to determine a first similarity of the first reference frame block to the first candidate block;

storing the second average;

retrieving the second average;

determining an offset of a subsequent candidate block based on the second average.

42. The method of claim 41 further comprising the step of:

storing boundary values with the second average.

43. The method of claim 41 wherein the step of determining the offset of the subsequent candidate block further comprises the step of:

determining the offset of the subsequent candidate block such that the offset does not exceed boundaries corresponding to the boundary values.

44. A program storage device readable by a machine, tangibly embodying a program of instructions executable by the machine to perform a method of motion estimation for encoding sequential frames, the method comprising the steps of:

dividing a reference frame of the sequential frames into a plurality of reference frame blocks;

dividing a first reference frame block of the plurality of reference frame blocks into a plurality of reference frame block regions;

averaging over a first reference frame block region of the plurality of reference frame block regions to obtain a first average;

defining a first candidate block in a current frame;

dividing the first candidate block into a plurality of candidate block regions;

averaging over a first candidate frame block region of the plurality of candidate frame block regions to obtain a second average;

using the first average and the second average to determine a first similarity of the first reference frame block to the first candidate block;

storing the second average;

retrieving the second average;

determining an offset of a subsequent candidate block based on the second average.

* * * * *